US005520425A

United States Patent [19]

Dowling

[11] Patent Number: 5,520,425

[45] Date of Patent: May 28, 1996

[54] POWER CLOSING DOOR LATCH DEVICE FOR MOTOR VEHICLE

[75] Inventor: Patrick Dowling, Yamanashi-ken, Japan

[73] Assignee: Mitsui Kinzoku Kogyo Kabushiki Kaisha, Tokyo, Japan

[21] Appl. No.: 360,062

[22] Filed: Dec. 20, 1994

[30] Foreign Application Priority Data

Dec. 21, 1993 [JP] Japan .................................... 5-345260
Dec. 22, 1993 [JP] Japan .................................... 5-346307

[51] Int. Cl.[6] ........................................................ C05C 3/06

[52] U.S. Cl. ......................... 292/201; 292/216; 292/336.3

[58] Field of Search .................................... 292/201, 216, 292/336.3, DIG. 23, DIG. 43

[56] References Cited

U.S. PATENT DOCUMENTS

| | | | |
|---|---|---|---|
| 4,364,249 | 12/1982 | Kleefeldt | 292/DIG. 23 X |
| 4,941,696 | 7/1990 | Yamada | 292/216 X |
| 5,106,133 | 4/1992 | Fukumoto et al. | 292/DIG. 23 X |
| 5,149,156 | 9/1992 | Kleefeldt | 292/201 X |
| 5,232,253 | 8/1993 | Tamiya | 292/DIG. 43 X |
| 5,236,234 | 8/1993 | Norman | 292/216 X |
| 5,288,115 | 2/1994 | Inoue et al. | 292/201 |

FOREIGN PATENT DOCUMENTS

| | | | |
|---|---|---|---|
| 3924230 | 2/1990 | Germany | 292/201 |
| 2-200982 | 8/1990 | Japan . | |

*Primary Examiner*—Steven N. Meyers
*Assistant Examiner*—Monica E. Millner
*Attorney, Agent, or Firm*—Browdy and Neimark

[57] ABSTRACT

A power closing door latch device for a motor vehicle comprises a latch engaged with a striker, a motor adapted to rotate when the latch is at a half latch position, an output member operative to rotate about a first shaft by the motor and having a slot extending radially and outwardly from the first shaft, a wire lever rotatably mounted on the first shaft and having an opening extending radially and outwardly from the first shaft, a slide member provided between the lever and the output member and having a first roller engaged with the slot and a second roller being engaged with the opening and being capable of rotating independent of the first roller, a spring for pushing the slide member in a direction in which the first roller is engaged with the slot. The wire lever is operatively connected to the latch, whereby the latch is moved by the lever to a full latch position if the output member is turned while the first roller is engaged with the slot. The device further has a canceling lever operative to slide the slide member against resilience of the spring when turned by operating an outer opening handle of a vehicle door, so as to disengage the first roller from the slot.

7 Claims, 6 Drawing Sheets

POWER CLOSING DOOR LATCH DEVICE FOR MOTOR VEHICLE

FIELD OF THE INVENTION

The present invention generally relates to a power closing door latch device for a motor vehicle and more particularly to a safety mechanism for use in a power closing door latch device.

DESCRIPTION OF THE PRIOR ART

The Japanese Patent Application Laid-open (Kokai Koho) No. 2-200982 describes a prior art latch device provided with a power closing mechanism for completely closing a door of a motor vehicle (namely, putting the door into what is called a "full latch state") with the aid of the power of a motor in case where the door is not completely closed (namely, the door is put into what is called a "half latch state") when a driver or a fellow passenger tries to close the door.

As illustrated in FIGS. 9 to 11, the prior art latch device has a latch B engaging with a striker A fixed to a vehicle body, a ratchet C for maintaining the engagement between the latch B and the striker A, a power unit D which operates when the latch B is turned to a half latch position, an output member G which is rotated about a first axis or shaft F by means of an output shaft E of the power unit D, an interlocking lever I connected to the latch B through a second axis or shaft H, an intermediate lever J rotatably supported on the first shaft F and engagable with the interlocking lever I, an opening lever K connected to a door opening handle (not shown), and a slide member O having a pin N engaging with both of a slot L bored in the output member G and an opening M formed in the intermediate lever J. The slide member O is pushed by a spring (not shown) in the direction of an arrow P. Normally, the slide member O connects the output member G with the intermediate lever J. However, when the slide member slides in the direction opposite to the direction of the arrow P, the connection between the output member G and the intermediate lever J is released. If the output member G is turned by means of the power unit D in case where the output member G is connected to the intermediate lever J, the intermediate lever J is also turned and causes the latch B through the interlocking lever I to turn to a "full latch position".

In the foregoing prior art device, a canceling lever R turned by means of the opening lever K is provided as a safety mechanism for urgently stopping the latch B which has been forced by the power unit D to turn. An abutting engagement surface S of the canceling lever R is turned counterclockwise from the position shown in FIG. 11 by manipulating the opening lever K and thus is brought into abutting engagement with a projection T of the slide member O. Then, the slide member O slides in the direction opposite to the direction of the arrow P against the elasticity of the spring, so that the connection between the output member G and the intermediate lever J. Thereby, the latch B is released and the forced rotation thereof is stopped.

A first problem concerning the prior art device resides in that the abutting engagement surface S of the canceling lever R is shaped like a flat surface in such a manner that the section of the surface S is linear as illustrated in FIG. 11. As is understood from FIG. 12, in the case where the canceling lever R is turned, the magnitude of displacement of the surface S varies widely according to which of positions on the surface S is selected to measure the displacement of the surface S. It is, therefore, very difficult to arrange the positional relation between the canceling lever R and the slide member O.

Further, a second problem concerning the prior art device resides in that the pin N of the slide member O is a mere projection which does not rotate. It is necessary for making the slide member O slide in the direction opposed to the direction of the arrow P to turn the canceling lever R by a force, the strength of which exceeds the sum of that of the frictional resistance between the pin and the inner surface of each of the slot L and the opening M and that of the resistance of a spring (not shown). Such a force, however, should have a very high strength because of the fact that the strength of the aforementioned friction resistance is very high.

SUMMARY OF THE INVENTION

Therefore, an object of the present invention is to provide a safety mechanism by which the positional relation between a canceling lever and a slide member can be easily arranged.

Further, another object of the present invention is to provide a safety mechanism which can reduce the strength of a force necessary to operate a canceling lever.

Other features, objects and advantages of the present invention will become apparent from the following description of a preferred embodiment with reference to the drawings in which like reference characters designate like or corresponding parts throughout several views.

DETAILED DESCRIPTION OF THE PREFERRED EMBODIMENT

Hereinafter, the preferred embodiment of the present invention will be described in detail by referring to the accompanying drawings.

Figure 1:
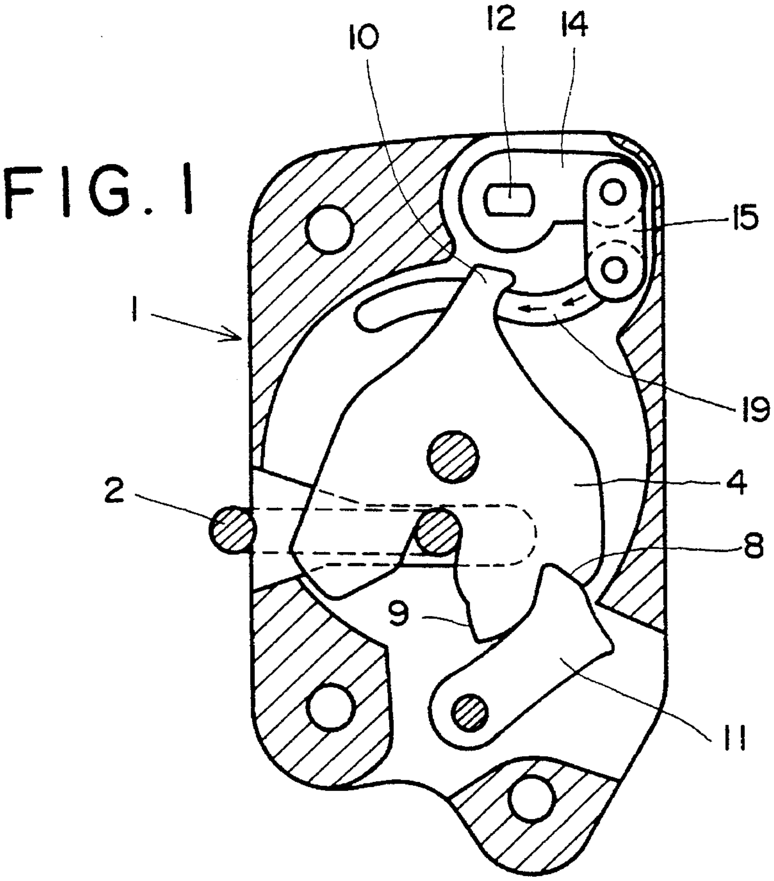
FIG. 1 is a longitudinal sectional view of a latch unit of the present invention.
Figure 3:
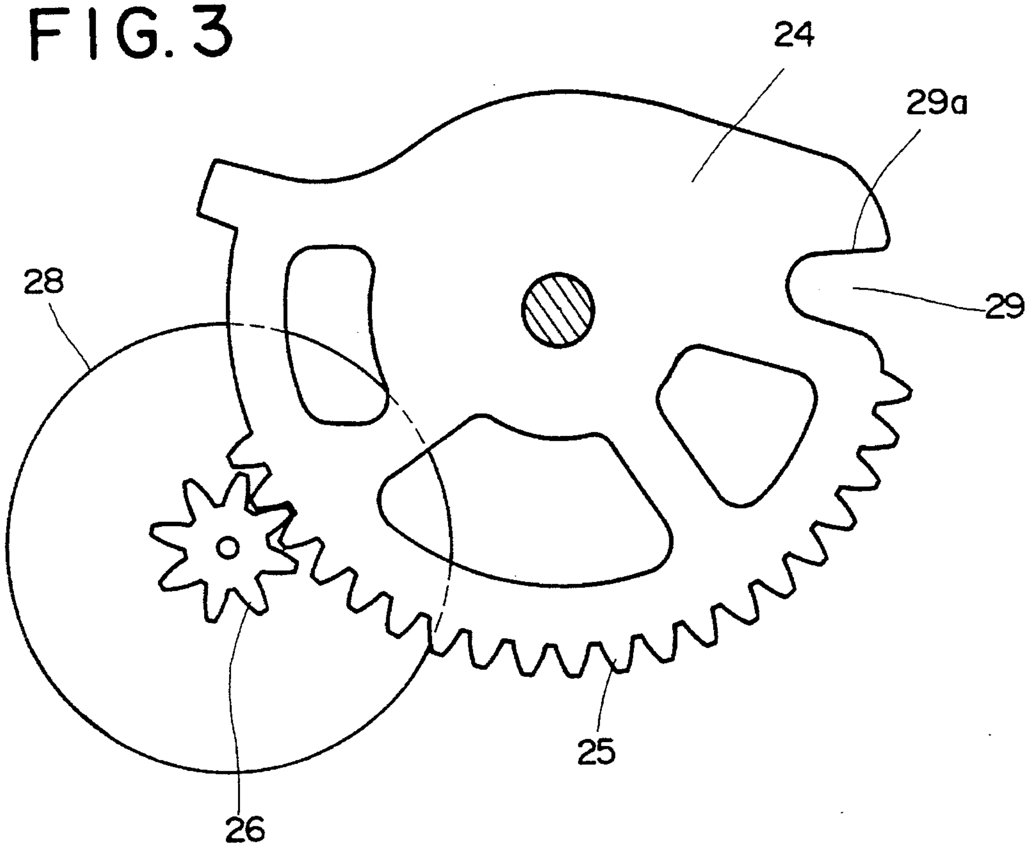
FIG. 3 is an enlarged view of an output member.
Figure 2:
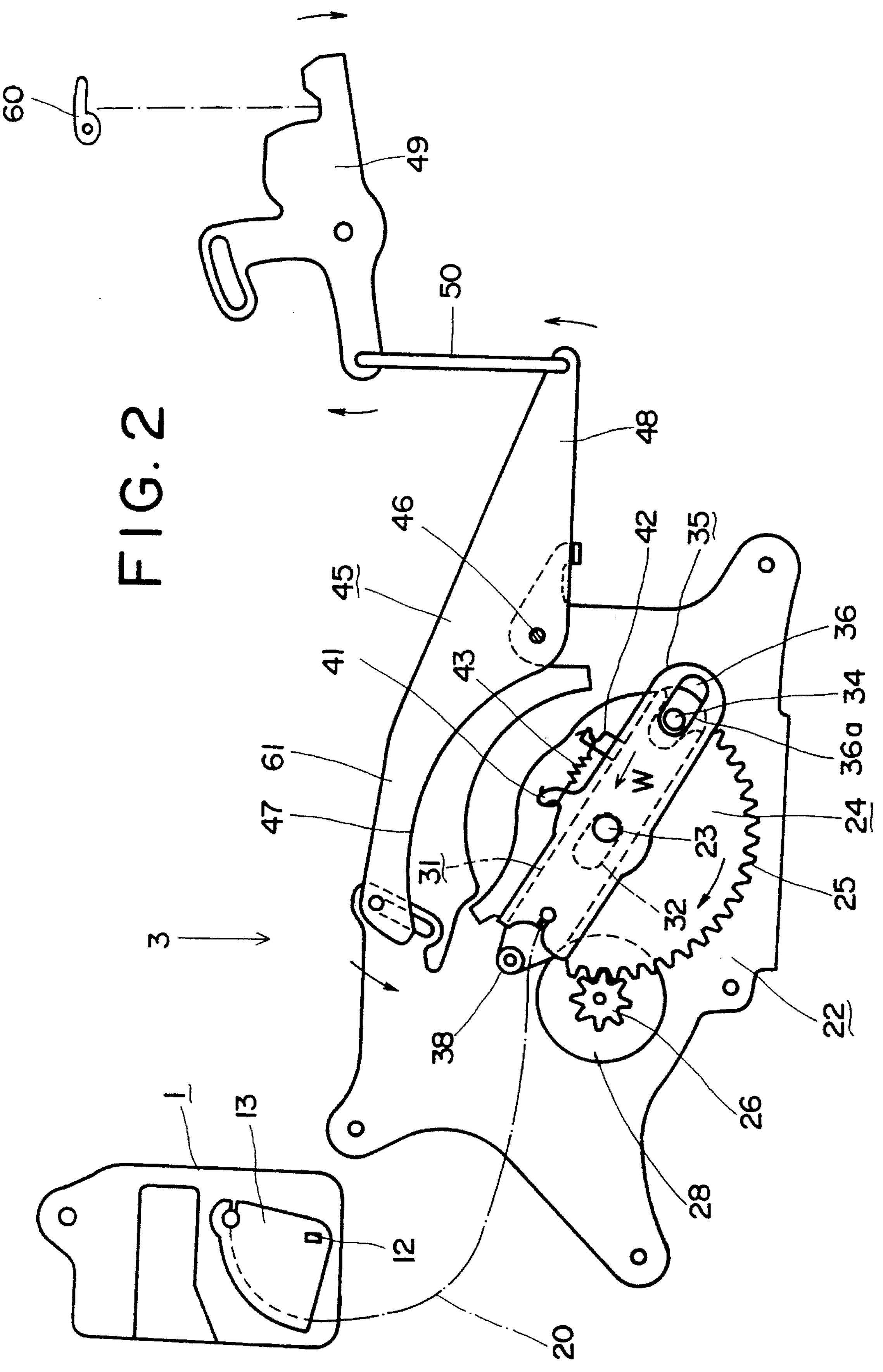
FIG. 2 is a side view of a power unit of the present invention.
Figure 4:
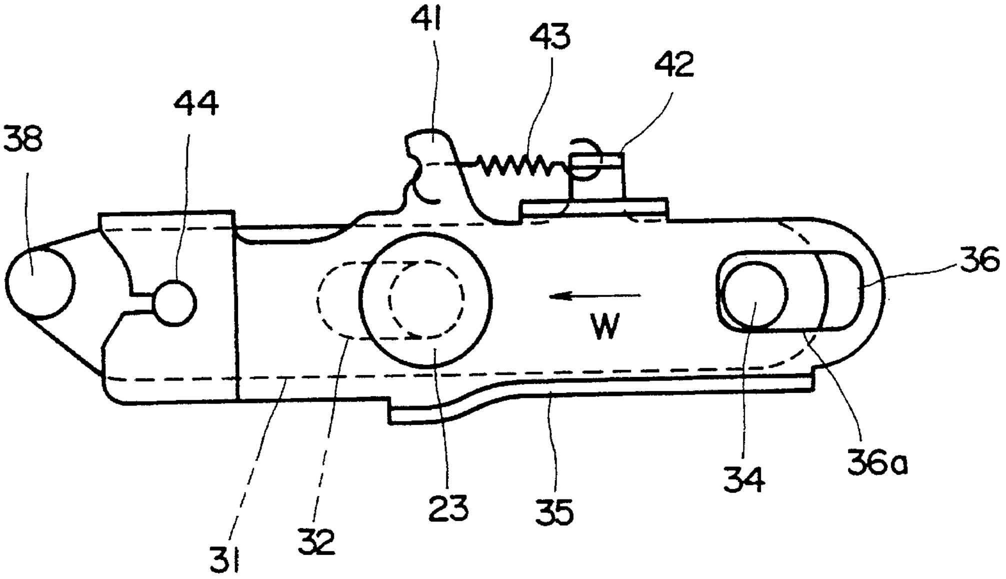
FIG. 4 is an enlarged view of a wire lever and a slide member.

As shown in FIG. 2, a power closing door latch device embodying the present invention has a latch unit 1 (see FIG. 1) engaged with a striker 2 and a power unit 3 for supplying power to the latch unit 1.

The latch unit 1 is similar to that described in the U.S. Pat. No. 5,288,115 of the assignee of the present application and has a latch 4 engaged with the striker 2, a ratchet 11 for maintaining the engagement between the latch 4 and the striker 2, a lever 13 (see FIG. 2) connected to the power unit 3 through a wire rope 20, a rotary arm 14 connected to the lever 13 through a connecting shaft 12 and a pusher body 15 rotatably mounted to an end of the arm 14 as shown in FIG. 1. When the wire rope 20 is taken up by the power unit 3, the lever 13 and the arm 14 are turned and the pusher body 15 moves along a guide slot 19 formed in the body of the unit. When the latch 4 is located at a half latch position where a first step portion 8 of the latch 4 is engaged with the ratchet 11, a leg portion 10 of the latch 4 overlaps the guide slot 19. Thus, if the wire rope 20 is taken up by the power unit 3 when the latch 4 is at the half latch position, the pusher body 15 guided along the slot 19 engages with the leg portion 10 of the latch 4. As a result, the latch 4 is moved to a full latch position and further the ratchet 11 is engaged with a second step portion 9 of the latch 4.

Figure 5:
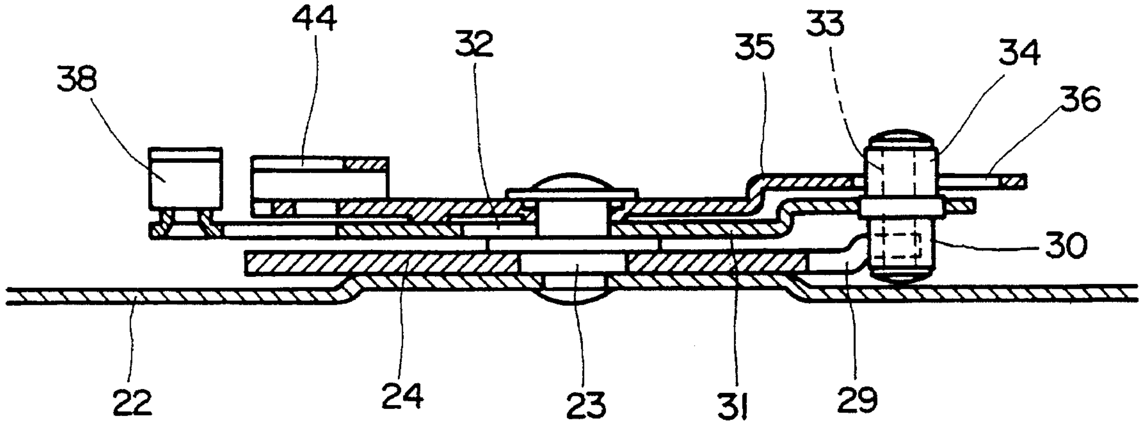
FIG. 5 is a sectional view of the wire lever and the slide member.

As illustrated in FIGS. 2 to 5, at the nearly central position of a base plate 22 of the power unit 3, an output member 24 is rotatably mounted on a shaft 23 may be a coaxial extension of shafts having different dimensions as shown in FIG. 5. The output member 24 is shaped like a semicircle. Further, a gear portion 25 meshing with a gear 26 mounted on an output shaft of a motor 28 is formed on an outer circumferential part of the output member 24. An elongated wire lever 35 having a hook 44 engaged with the wire rope 20 is provided in such a manner to overlap the output member 24 and is rotatably supported on the shaft 23. Further, an elongated slide member 31 being capable of sliding in the direction of an arrow W or in the opposite direction is provided between the wire lever 35 and the output member 24.

Figure 7:
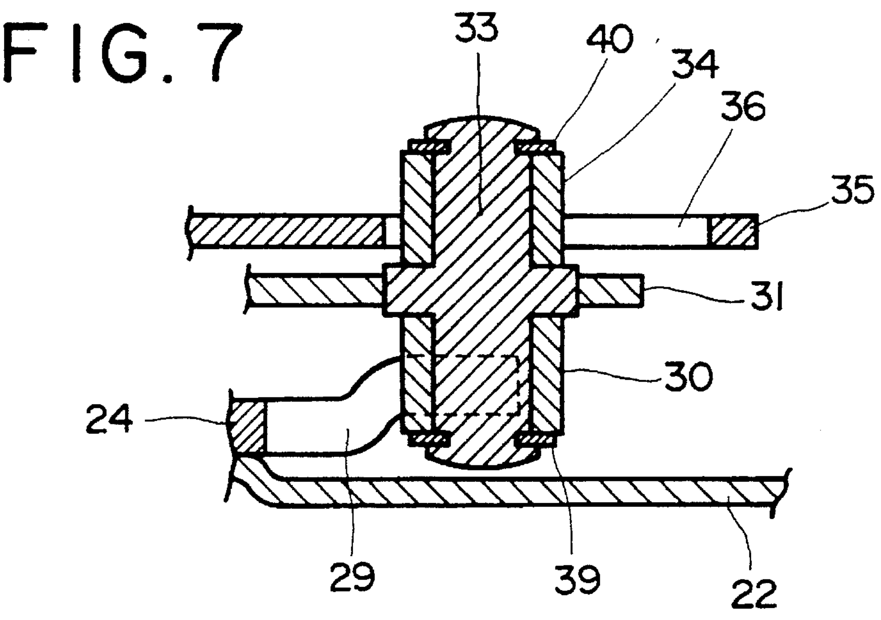
FIG. 7 is an enlarged sectional view of a pin and a roller of the slide member.
Figure 8:
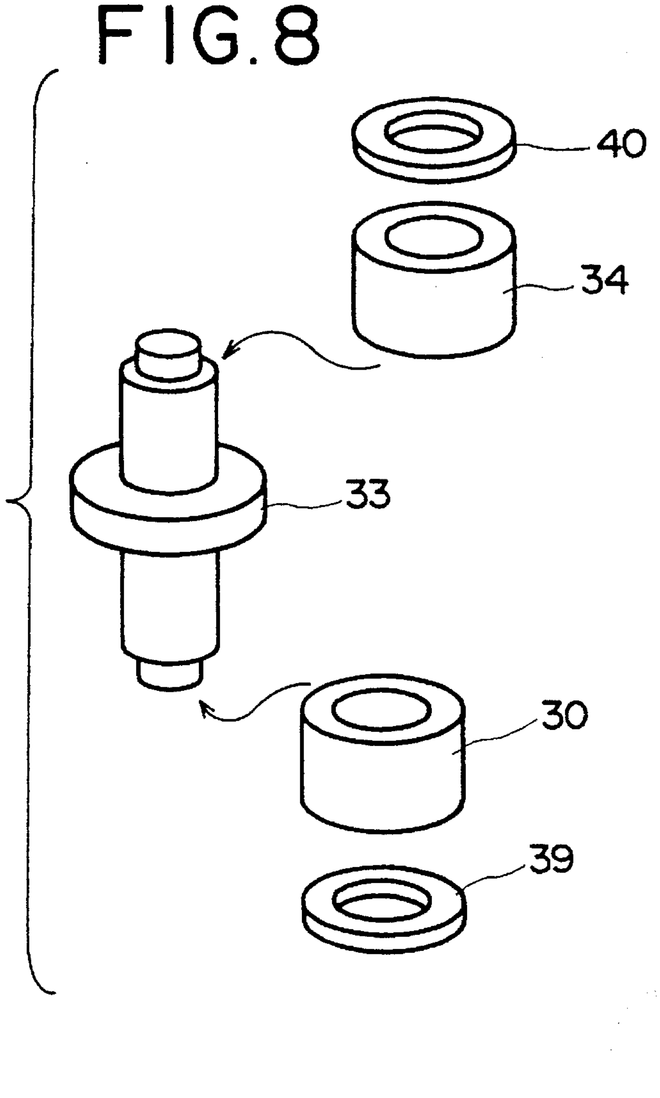
FIG. 8 is an exploded perspective view of a double pin and a roller.
Figure 9:
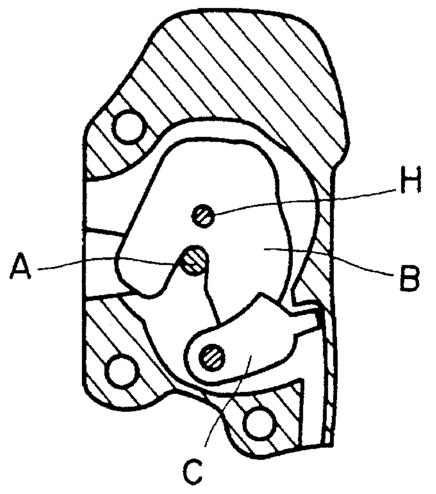
FIG. 9 (PRIOR ART)
FIGS. 9 to 12 are diagrams for illustrating examples of publicly known devices.
Figure 11:
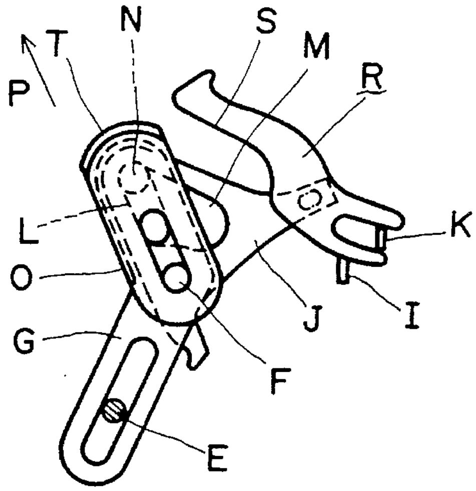
FIG. 11 (PRIOR ART)
Figure 10:
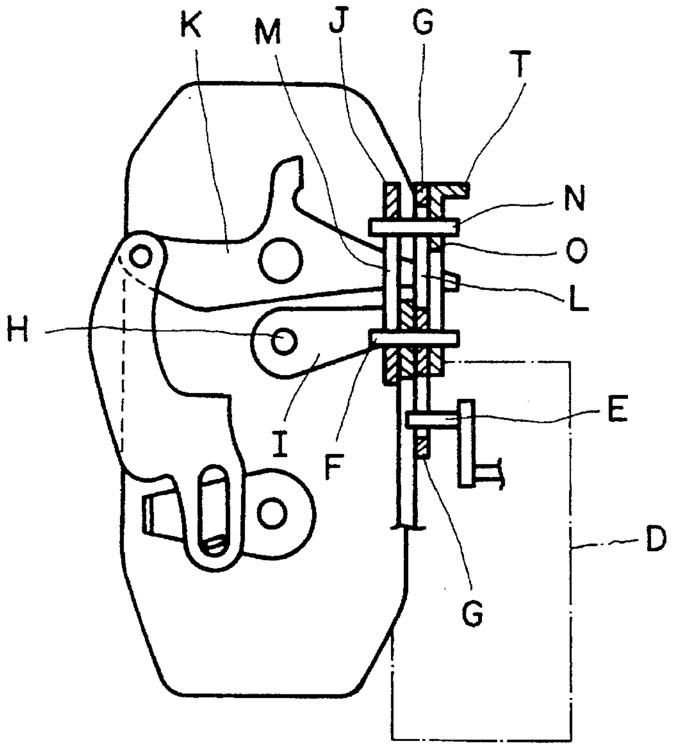
FIG. 10 (PRIOR ART)

At the nearly central position of the slide member 31, a slot 32 pierced with the shaft 23 is formed. As illustrated in FIGS. 7 and 8, a double pin 33 protruding from the slide member 31 upwardly and downwardly is fixed at an end of the slide member 31. Rollers 30 and 34 are rotatably mounted on upper and lower parts of the pin 33, respectively, by means of washers 39 and 40 to prevent the rollers from coming off. A U-shaped slot 29 with which the roller 30 engages is formed in the output member 24. Further, a slot 36 with which the roller 34 engages is bored in the wire lever 35. A spring 43 for pushing the slide member 31 in the direction of the arrow W is provided between a projection 42 of the slide member 31 and a projection 41 of the wire lever 35. Normally, the engagement between the roller 30 and the U-shaped slot 29 is maintained by the action of the spring 43. However, when the slide member 31 is slid in the direction opposed to the direction of the arrow W, the roller 30 is disengaged from the U-shaped slot 29.

When the roller 30 is engaged with the slot 29, the output member 24 is connected to the wire lever 35. If the output member 24 maintaining the connection therewith is rotated by the motor 28, the wire lever 35 takes up the wire rope 20.

Figure 6:
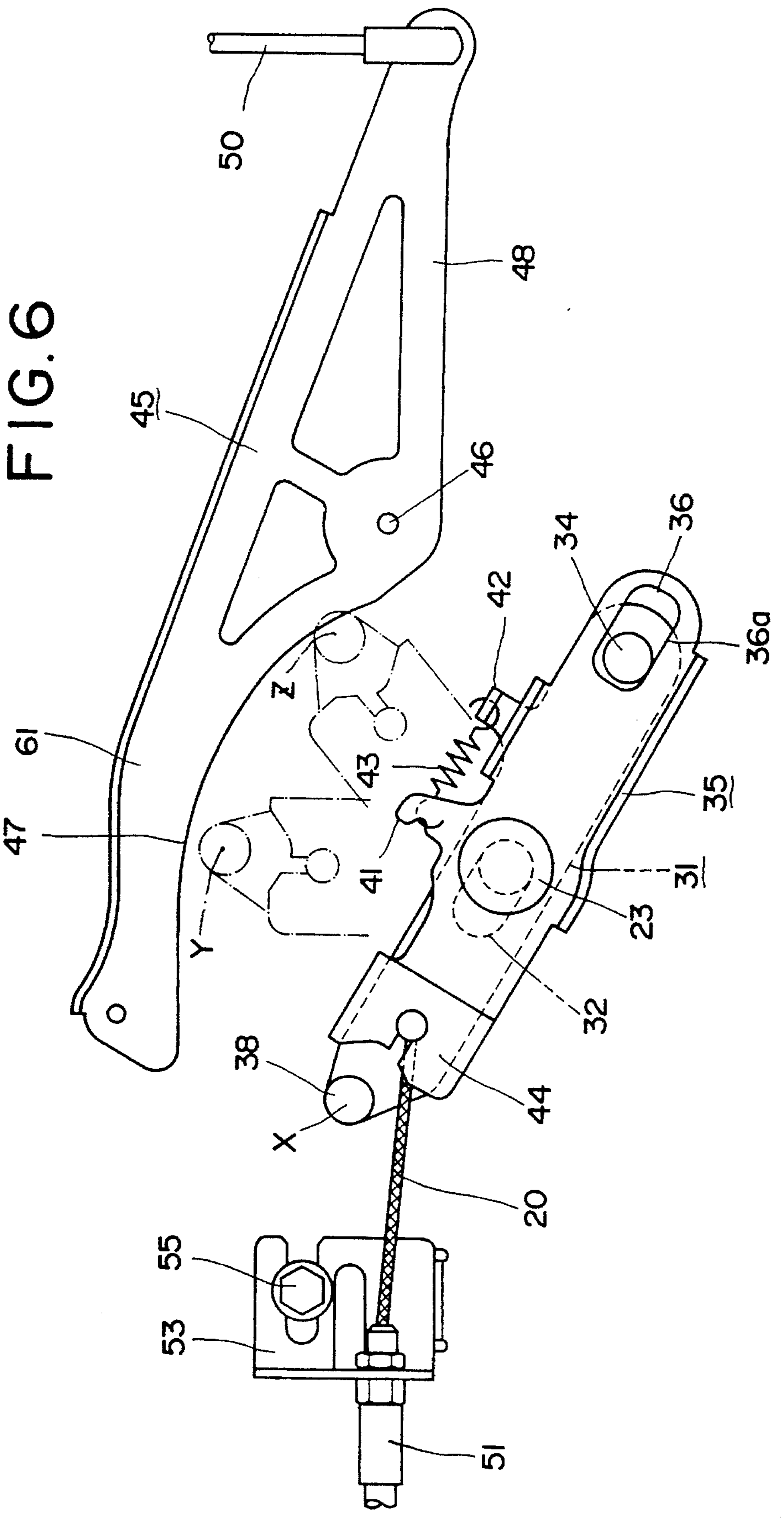
FIG. 6 is a diagram for illustrating the relation between the slide member and the canceling lever.

When the motor 28 is not energized, the slide member 31 and the lever 35 are placed at a stand-by position X indicated by solid lines and curves in FIG. 6 by the action of a spring (not shown). In this state, the pusher body 15 is located at a position indicated in guide slot 19 in FIG. 1. When the slide member 31 and the lever 35 are turned to the half latch position Y indicated by imaginary lines and curves, the pusher body 15 is brought into abutting engagement with the leg portion 10 of the latch 4. Further, when the slide member 31 and the lever 35 are turned to the full latch position Z indicated by imaginary lines and curves, the pusher body 15 pushes the leg portion 10 of the latch 4 to move the latch 4 to the full latch position.

A canceling lever 45 mounted to the base plate 22 through a shaft 46 has a first arm 48 connected through a rod 50 to an opening lever 49 and a second arm 61 provided with an abutting engagement surface 47. As shown in FIG. 6, the section of the abutting engagement surface 47 has a shape similar to the revolution mark or locus of a canceling roller 38 provided at the other end of the slide member 31. When an outer opening handle 60 is operated, the canceling lever 45 is turned counterclockwise through the opening lever 49 as viewed in FIGS. 2 and 6. Then, the abutting engagement surface 47 is brought into abutting engagement with the canceling roller 38 of the slide member 31 located at a position between the half latch position Y and the full latch position Z. Thus the slide member 31 is slid in the direction opposed to the direction of the arrow W against the resilience of the spring 43. Thereby, the roller 30 of the slide member 31 is disengaged from the U-shaped slot 29 bored in the output member 24. Consequently, the engagement between the slide member 31 and the output member 24 is canceled. Therefore, if the outer opening handle 60 is operated when the latch 4 is forcibly turned under the power of the motor 28, the forced revolution of the latch 4 can be stopped immediately.

As illustrated in FIG. 6, the wire rope 20 is covered with a relatively hard cover shell 51 excepting both of end portions thereof. An end portion of the cover shell 51 is fixed to an adjuster 53 fastened to the base plate 22 with a bolt 55. Effects of variations in the lengths of the delivered wire ropes 20 are eliminated by regulating the fixing position of the adjuster 53.

Hereinafter, an operation of this embodiment will be described in detail by referring to the accompanying drawings.

When a door is open, the wire lever 35 and the slide member 31 are at the stand-by position X. Further, the roller 30 of the slide member 31 is engaged with the U-shaped slot 29 bored in the output member 24 by the action of the spring 43.

When the door is lightly closed and the latch 4 is turned to the half latch position owing to the engagement with the striker 2, the motor 28 starts rotating and the output member 24 is turned clockwise as viewed in FIG. 2. Then, owing to the engagement between the roller 30 of the slide member 31 and the U-shaped slot 29 bored in the output member 24, the slide member 31 is also turned clockwise. Moreover, the wire lever 35 connected to the slide member 31 through the roller 34 is also turned clockwise. Thereby, the wire rope 20 is taken up and the lever 13 and the arm 14 are turned. Consequently, the pusher body 15 moves along the guide slot 19.

When the wire lever 35 is turned to the half latch position Y of FIG. 6, the pusher body 15 is brought into abutting engagement with the leg portion 10 of the latch 4 located at the half latch position. When the wire lever 35 is turned to the full latch position Z, the pusher body 15 moves the latch 4 to the full latch position. Thus the ratchet 11 is engaged with the second step portion 9 of the latch 4. Subsequently, when the motor 28 is stopped, the output member 24, the wire lever 35 and so on are returned to the position illustrated in FIG. 2. Thus a power closing door operation, namely, an operation of closing the door is completed.

During the power closing door operation, if a driver or a fellow passenger catches his hand, clothes, bag or the like in the door, he immediately operates the outer opening handle 60. Then, the canceling lever 45 is turned counterclockwise through the opening lever 49 as viewed in FIGS. 2 and 6. Further, the abutting engagement surface 47 of the lever 45 presses the canceling roller 38 of the slide member 31 and slides the slide member 31 in the direction opposed to the direction of the arrow W against the resilience of the spring 43. Thereby, the engagement between the roller 30 of the slide member 31 and the U-shaped slot 29 bored in the output member 24 is canceled. Thereafter, the rotation of the output member 24 is not transmitted to the slide member 31. Further, the latch 4 is set free. Thus the power closing door operation is canceled.

Figure 12:
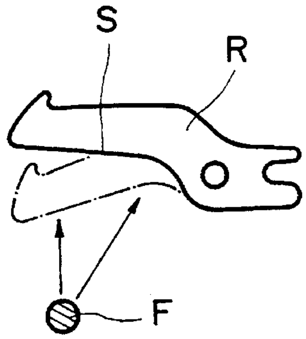
FIG. 12 (PRIOR ART)

In the case of this canceling action, the abutting engagement surface 47 of the canceling lever 45 is formed in such a manner that the section of the surface 47 is shaped like an arc. Thus, the variation in the magnitude of displacement of the abutting engagement surface 47, which depends on the position of a point thereon selected to measure the displacement, becomes smaller in comparison with a case that the section of the abutting engagement surface S is linear as illustrated in FIG. 12. Therefore, the positional relation between the canceling lever 45 and the slide member 31 can be easily arranged.

Further, in the case of the canceling action described hereinabove, the canceling lever 45 is operated by the force, the strength of which exceeds the sum of that of the elastic resistance of the spring 43 and that of the frictional resistance between the slide member 31 and each of the wire lever 35 and the output member 24. However, the friction resistance in this case is extremely small in comparison with the case of the prior art device. Thereby, the canceling lever 45 can be operated very lightly by a force having very small strength. Namely, the output member 24 rotated by the motor 28 is turned clockwise as viewed in FIG. 2, so that the roller 30 of the slide member 31 is pushed by the right wall **29*a* of the U-shaped slot 29. On the other hand, the wire lever 35 meets with very large rotational resistance of the latch 4. Thus the left wall 36*a* of the slot 36 is put into strong abutting engagement with the roller 34 of the slide member. Therefore, in case where the rollers 30 and 34 are formed as a single roller, this roller can hardly rotate even when the slide member 31 is slid in the direction opposed to the direction of the arrow W. Further, large friction resistance is generated on a contact surface between this single roller and the left wall. In contrast, in the case of the device of the present invention, the two rollers rotating independent of each other are in contact with the left wall 36*a* of the slot 36 and the right wall 29*a* of the U-shaped slot 29, respectively. Thus, when the slide member 31 is slid in the direction opposed to the direction of the arrow W, these rollers rotate alternately. Thereby, the friction resistance is reduced largely. Consequently, the force required to operate the canceling lever 45** becomes very light.

Furthermore, as the slide member 31 moves to the full latch position Z, the resilience of the latch 4 becomes larger and thus the friction resistance increases. However, as the canceling roller 38 of the slide member gets closer to the shaft 46, the force required for the canceling operation of the canceling lever 45 increases on what is called the principle of leverage. Consequently, the strength of the force required for operating the outer opening handle 60 is kept nearly constant.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A power closing door latch device for a motor vehicle comprising:

a latch engaged with a striker adapted to be fixed to a vehicle body;

a motor adapted to rotate when the latch is at a half latch position;

an output member operative to rotate about a first shaft by means of the motor, said output member having a slot extending radially and outwardly from the first shaft;

a lever rotatably mounted on the first shaft, said lever having an opening extending radially and outwardly from the first shaft;

a slide member having at least a pin engaged with the slot of the output member and the opening of the lever;

a spring for pushing the slide member in a direction in which the pin is engaged with the slot;

said lever being operatively connected to the latch, whereby the latch is moved by the lever to a full latch position if the output member is turned while the pin is engaged with the slot; and a canceling lever operative to slide the slide member against resilience of the spring when turned by operating an outer opening handle of a vehicle door, so as to disengage the pin from the slot, said canceling lever having an arcuate abutting engagement surface, the section of which is shaped like a revolution locus of an end portion of the slide member.

2. A power closing door latch device according to claim 1, wherein the lever is connected to the latch through a wire rope.

3. A power closing door latch device for a motor vehicle comprising:

a latch engaged with a striker adapted to be fixed to a vehicle body;

a motor adapted to rotate when the latch is at a half latch position;

an output member operative to rotate about a first shaft by means of the motor, said output member having a slot extending radially and outwardly from the first shaft;

a lever rotatably mounted on the first shaft, said lever having an opening extending radially and outwardly from the first shaft;

a slide member provided between the lever and the output member and having a first roller engaged with the slot and a second roller being engaged with the opening and being capable of rotating independent of the first roller;

a spring for pushing the slide member in a direction in which the first roller is engaged with the slot;

said lever being operatively connected to the latch, whereby the latch is moved by the lever to a full latch position if the output member is turned while the first roller is engaged with the slot; and a canceling lever operative to slide the slide member against resilience of the spring when turned by operating an outer opening handle of a vehicle door, so as to disengage the first roller from the slot.

4. A power closing door latch device according to claim 3, wherein the first roller and the second roller are placed on a same axis.

5. A power closing door latch device according to claim 3, wherein the first roller is provided at one of two sides of the slide member and the second roller is provided at the other side of the slide member.

6. A power closing door latch device according to claim 3, wherein the lever is connected to the latch through a wire rope.

7. A power closing door latch device according to claim 3, wherein the canceling lever has a first arm connected to the outer opening handle and a second arm which is able to be in abutting engagement with the slide member, wherein an arcuate abutting engagement surface, the section of which is shaped like a revolution locus of an end portion of the slide member, is formed on the second arm.

* * * * *